(12) United States Patent
Scott

(10) Patent No.: US 6,814,160 B1
(45) Date of Patent: Nov. 9, 2004

(54) AUTOMATED SEISMIC GEOPHONE DEPLOYMENT

(75) Inventor: Gary L. Scott, Sugar Land, TX (US)

(73) Assignee: WesternGeco, LLC, Houston, TX (US)

( * ) Notice: Subject to any disclaimer, the term of this patent is extended or adjusted under 35 U.S.C. 154(b) by 658 days.

(21) Appl. No.: 09/347,695

(22) Filed: Jul. 3, 1999

(51) Int. Cl.[7] .............................................. G10K 11/00
(52) U.S. Cl. ........................................ 175/19; 181/0.5
(58) Field of Search ............................. 175/19, 22, 67; 181/0.5, 101, 122; 367/191, 188, 178; 173/1, 43, 23–28, 20

(56) References Cited

U.S. PATENT DOCUMENTS

| | | | | |
|---|---|---|---|---|
| 2,154,732 A | * | 4/1939 | Dahl | |
| 2,660,403 A | * | 11/1953 | Roland | |
| 3,710,876 A | * | 1/1973 | Christensen | 173/43 |
| 4,838,379 A | * | 6/1989 | Maxwell | 181/122 |
| 5,007,031 A | * | 4/1991 | Erich, Jr. | 367/178 |
| 5,206,840 A | * | 4/1993 | Cobbs et al. | 367/178 |
| 5,315,074 A | * | 5/1994 | Berquist | 181/0.5 |

\* cited by examiner

*Primary Examiner*—Robert E. Pezzuto
(74) *Attorney, Agent, or Firm*—Jeffrey E. Griffin; Jeffrey A. Pyle; Williams Morgan & Amerson, P.C.

(57) ABSTRACT

An apparatus and method for orienting and for coupling geophones relative to soil. A hammer device oriented to the vertical drives a head into the soil to generate a case opening. Vertical orientation of the case opening and depth automatically orients a geophone case to vertical and further controls the coupling of the geophone to the soil. Such combination facilitates orientation of the geophone to the selected compass heading and significantly reduces corrective data processing. Control over case opening placement in different soil conditions is automatically provided, and data regarding local position and orientation is recorded for future data processing. Operator errors are reduced and overall production efficiency is enhanced.

19 Claims, 2 Drawing Sheets

AUTOMATED SEISMIC GEOPHONE DEPLOYMENT

BACKGROUND OF THE INVENTION

The present invention relates to the field of geophones coupled with soil to detect seismic source energy. More particularly, the invention relates to an improved apparatus and method for coupling a geophone to soil.

Seismic operations deploy geophones along survey lines. The geophones are coupled to the soil at selected locations and detect source seismic energy reflected from subsurface geologic formations and interfaces and refracted to the surface. Movement of the surface exists along any degree of the three axes, and can be measured with three sensor geophones located in a single housing.

The effectiveness of geophone coupling to soil is essential to the accurate collection of seismic data. Three sensor geophones detect the magnitude and direction of transmitted seismic energy along different axes. Geophone orientation variations from vertical introduce significant error in measurements regarding the source direction of reflected seismic energy. Slight inclinations from vertical or from a selected compass heading can be adjusted during data processing, however additional processing time, cost and effort is required. Geophones typically integrate level indicator bubbles in the geophone case, however orientation of geophones to such bubbles requires movement of the geophone case after the case is initially planted in the soil. Such movement loosens the attachment between the geophone and soil This loose attachment creates a boundary interface between the soil and geophone which reduces coupling effectiveness and accuracy of the geophone sensed data.

Geophone sensor placement is complicated in regions having varying soil conditions. In different seismic survey regions, the soil can range from marsh to consolidated or unconsolidated soil to bedrock. The hardness of each soil condition can vary greatly within a lateral distance of several meters, thereby complicating efforts to effectively couple geophones to the soil. If the geophone is not adequately planted into the soil, flow noise from wind and moving water can adversely affect the seismic data recorded. When the geophone stakes are planted into the soil, wind and moving water exert forces against the geophone which are increased by the moment arm height of the geophone. Such environmental forces cause case flexure and resonance which generate acoustic "noise" and which reduce seismic data quality and require additional data processing procedures.

Conventional three component geophones use surface mounted assemblies having spikes on the lower end of the geophone housing, and such geophone cases couple the case bottom to the soil with the sensors located above the coupling point. Lateral movement of the soil and coupled case bottom is not accurately sensed at the case upper end because of case flexure and resonance. Field personnel plant each geophone by aligning the geophone case to the proper compass heading, and by monitoring a bubble level indicator to assure the vertical orientation of the geophone case. Because conventional geophone cases are planted on the surface, field personnel must bend downward as the geophone is planted. This process is time consuming, tiring, and leads to geophone installation errors.

Various systems have been developed to plant geophones in soil. U.S. Pat. No. 4,300,220 to Goffet al. (1981) disclosed a geophone holder having a frame for supporting three geophones along principal axes of sensitivity. U.S. Pat. No. 4,838,379 to Maxwell (1989) disclosed a receptacle for receiving a geophone and for permitting the release of the geophone from the receptacle. A magnetic compass and bubble level were located one meter from:.the geophone receptacle and facilitated manual installation of the geophone. U.S. Pat. No. 5,007,031 to Erich (1991) disclosed a geophone planting tool for engaging the outer geophone case as the geophone was planted into soil. U.S. Pat. No. 5,010,531 to McNeel (1991) disclosed a geophone housing having soil anchoring spikes and a level mechanism for adjusting the spikes relative to the geophone housing. U.S. Pat. No. 5,124,956 to Rice et al. (1992) disclosed a geophone housing anchored to the soil with a bow spring or drill bit larger than the housing. U.S. Pat. No. 5,231,252 to Sansone (1993) disclosed an open seismic sensor platform having a spike for anchoring each geophone to the soil.

Other devices have been developed to anchor geophones to the seafloor or to stabilize geophones against dislocation. U.S. Pat. No. 5,142,499 to Fletcher (1992) disclosed a setting tool for releasably anchoring geophone spikes to a seafloor. U.S. Pat. No. 5,189,642 to Donoho et al. (1993) disclosed a marine seismic recorder having a ballast ring cooperating with a geophone package, and United States Patent No. 5,253,223 to Svenning et al. (1993) disclosed a marine geophone package having an electronic angle gauge together with geophones arranged in the x, y and z axes. U.S. Pat. No. 5,434,828 to Ldgan (1995) disclosed a geophone stabilizer for reducing movement of the geophone due to water currents and other environmental forces.

Other devices have been developed to expedite geophone placement in land based seismic operations. For example, U.S. Pat. No. 5,315,074 to Berquist (1994) disclosed a tractor mounted device having a push tube for planting a geophone. A vibration device was connected with a push tube to facilitate soil penetration by the geophone. Although such device is useful in unconsolidated soils, the device is limited in survey regions when the hardness and composition of the soil varies.

The accuracy of seismic data significantly depends on the proper orientation of geophone housings and on the effective coupling of such housings to local soil conditions. The efficiency of seismic operations depends on the ability to quickly and accurately deploy geophones in the desired locations. Accordingly, a need exists for improved geophone planting devices and methods for coupling geophones to soil.

SUMMARY OF THE INVENTION

The present invention provides an apparatus and method for coupling a seismic geophone to soil. The apparatus comprises a portable chassis, a frame engaged with the chassis, an orientation device engaged with the frame for selectively orienting the frame to vertical, and a hammer moveable relative to the frame to contact the soil in a vertical direction for generating a case opening suitable for insertion of the geophone, wherein the hammer is retractable from the case opening generated by the hammer.

In different embodiments of the invention, a template prevents dislocation of the soil as the hammer is retracted from the case opening. A controller can control movement of the hammer in a vertical direction, and a positioning device can identify the case opening location.

The method of the invention comprises the steps of moving a portable chassis to a selected position, operating an orientation! device engaged with a frame mounted to the chassis to selectively orient the frame to vertical, moving a hammer relative to the frame to contact the soil in a vertical direction to form a case opening suitable for insertion of the geophone, ceasing downward movement of the hammer at a selected position sufficient to form a case opening having a selected shape, and retracting the hammer from said case opening without disturbing the soil compaction.

DESCRIPTION OF THE PREFERRED EMBODIMENTS

The invention contains a powerful[]hammer for driving a preformed metal die into soil to provide a compressed indentation formed to receive a geophone. As defined herein, the term "soil" means the top layer of the Earth, which can comprise dirt, clay, unconsolidated aggregate, bedrock, marsh, organic material, and other materials having different compositions and hardness.

Figure 1:
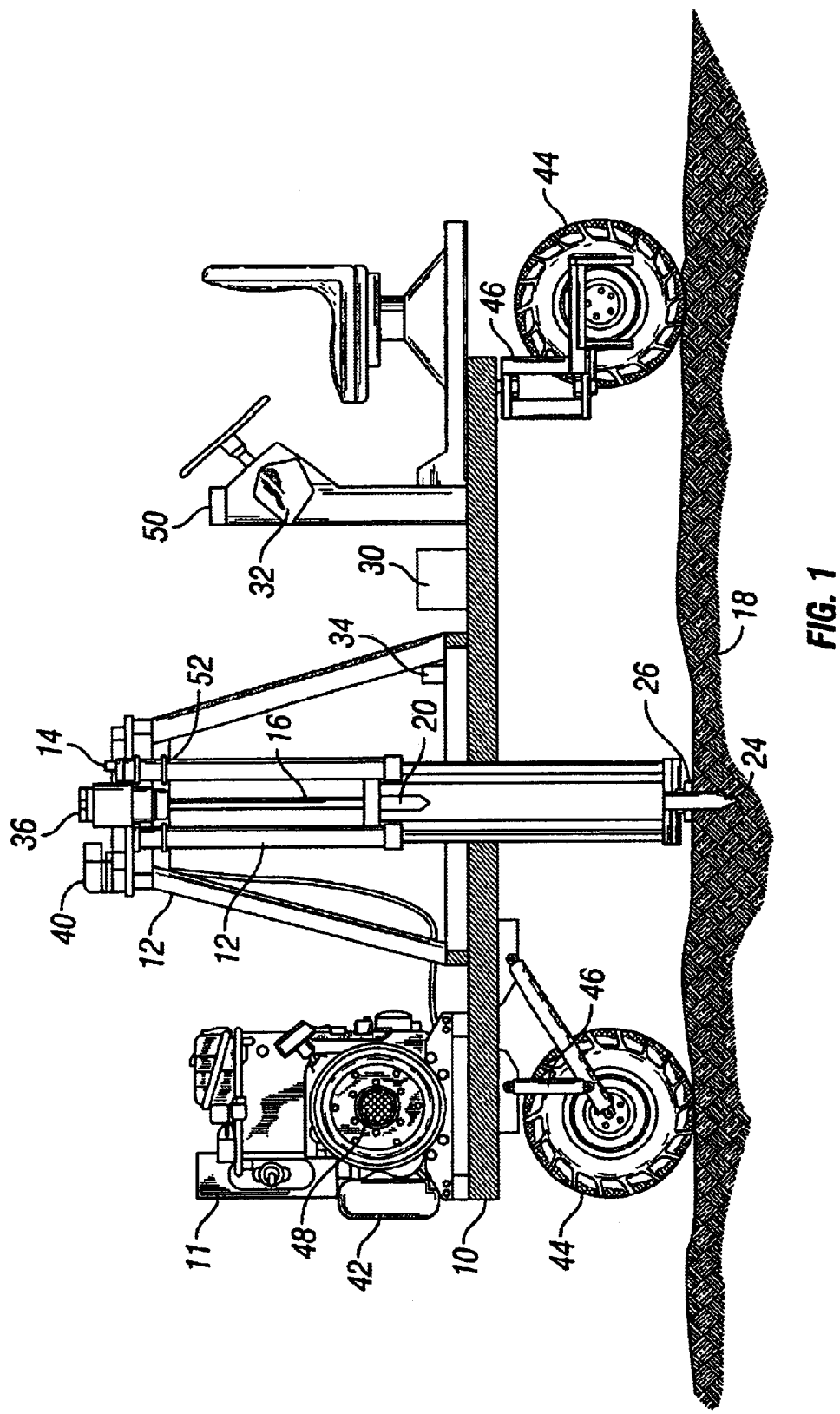
FIG. 1 illustrates a portable chassis supporting a frame for guiding a hammer vertically downwardly into contact with soil.

Referring to FIG. 1, chassis 10 is portable and can be moved across the survey region. Chassis 10 can include an independent power supply or can be towed by another vehicle (not shown).Chassis 10 can be sufficiently stable to perform additional functions without movement, or can be stabilized with outrigger pads or other mechanical or hydraulic devices (not shown). Frame 12 is engaged with chassis 10 and includes an orientation device such as gimbal 14 for permitting vertical orientation of frame 12 regardless of the chassis 10 orientation. Gimbal 14 provides unrestrained movement of frame 12 to a vertical position, then gimbal 14 or frame 12 is secured to retain such vertical orientation. Hammer 16 is moveably engaged with frame 12 and is reciprocable along the longitudinal axis of frame 12. Hammer 16 is initially retained at an elevated position relative to frame 12 and is releasable along frame 12 to contact soil 18. Hammer 16 can comprise different shapes and configurations for accelerating toward soil 18. The acceleration may be accomplished with gravity or with a motive force powered by hydraulics, compressed gas, elongated elastic members or gun powder actuated devices.

Figure 2:
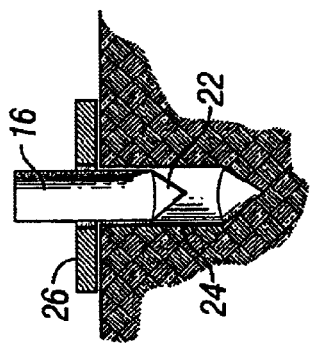
FIG. 2 illustrates the hammer in contact with the soil to form a case opening.

Hammer 16 can include removable head 20 for contacting soil 18. In a preferred embodiment of the invention, head 20 is interchangeable to provide different configurations and indentations in soil 18 depending on the soil conditions and geophone requirements. Head 20 can have a flat or shaped bottom depending on the soil hardness and composition, and can be solid or hollow. As shown in FIG. 2, head 20 has tapered bottom 22 to facilitate piercing and compaction of soil 18. By providing such flexibility, hammer 16 is adaptable to different sizes and configurations of geophones. In unconsolidated soils, the penetration of head 20 compacts soil 18 to form the perimeter of case opening or hole 24, thereby providing a hardened boundary more conducive to transfer of seismic energy from soil 12 to a geophone planted within case hole 24. When a geophone is planted into case hole 24, thee hardened boundary effectively entends the geophone case size by directly coupling the geophone to a larger surface area.

A template such as plate 26 contacts the upper surface of soil 18 as hammer 16 drives head 20 into soil 18. For loose and unconsolidated soil 18, plate can prevent upward deformation of soil 18. This feature of the invention significantly increases the compaction of soil 18 by controlling the direction of compaction, thereby increasing the effectiveness of the hardened boundary surrounding case hole 24. Alternatively, plate 26 can be lowered into contact with soil 18 after head 20 is driven into soil 18 so that as head 20 is retracted to clear case hole 14, plate 26 retains the upper layer of soil 18 in position so that soil 18 surrounding case hole 24 is, not disturbed by withdrawal or retraction of head 20. In this manner, the integrity of each case hole 24 indentation is retained so that more effective coupling between geophones and soil 18 is obtained after the geophones are planted in the case holes 24.

Figure 3:
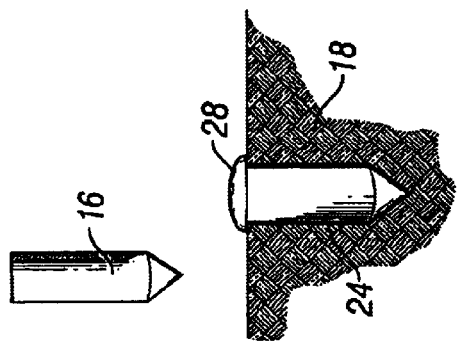
FIG. 3 illustrates retraction of the hammer from the case opening.

Because frame 12 is accurately oriented in a vertical direction, case hole 24 is automatically oriented vertically. After case hole 24 is created in soil 18 and head 20 is retracted as illustrated in FIG. 3, geophone 28 can be inserted into case hole 24. Such insertion can be performed manually or automatically. Frame 12 can be adapted to automatically guide geophone 28 into case hole 24. The configuration of case hole 24 automatically orients geophone 28 to vertical, thereby eliminating the need to manually verify this orientation. In a preferred embodiment of the invention, geophone 28 is automatically orientated so that a selected compass heading is maintained as geophone 28 is inserted into case hole 24. By providing for such orientation upon insertion, subsequent manipulation of geophone 28 tending to loosen the connection with soil 18 can be avoided. An impact force or a pushing force can be exerted on the top of geophone 28 to secure geophone with soil 18 so that solid contact is made. Although geophone 28 can be positioned into case hole 24 with frame 12 to facilitate automation of such installation, geophone 28 can be inserted into case hole 24 manually or with another vehicle or device trailing chassis 10.

After case hole 24 is formed, chassis 10 is transported to the next geophone location and is stabilized for generation of the next case hole 14. Global positioning ("GPS") equipment 30 is attached to chassis 10 and records data regarding the precise location and attitude of each case hole 24. Alternatively, GPS equipment 30 can broadcast the frame 12 location and attitude to a remotely located control station (not shown).

Automated vertical control such as gimbal 14 is attached to frame 12 and is connected with computerized controller 32 linked with electronic inclinometer 34. In other embodiments of the invention, gimbal 14 can be replaced with devices having mechanical means connected to controller 32 for controlling frame 12 orientation. In this embodiment controller 32 is responsible for achieving a precise vertical attitude and for detecting variations from such attitude. Controller 32 can automatically provide such vertical orientation so that operator control is not required. Controller 32 can also record such orientation to provide a record of any inclination errors experienced. If controller 32 determines that a vertical inclination is not achieved, operation of hammer 16 is restricted until the proper vertical inclination is achieved.

Controller 32 also monitors the orientation of each geophone so that the compass heading of each geophone is known. Alternatively, the shape of each geophone case can be marked or configured to provide orientation control. Controller 32 monitors the placement of each geophone, and variations in compass heading can be recorded for subsequent data correction.

Figure 4:
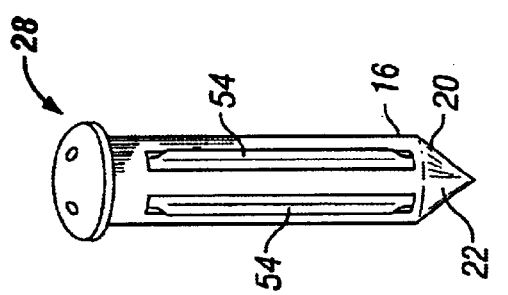
FIG. 4 illustrates automatic insertion of a geophone in the case opening.

Stop 36 can be attached to or integrated within frame 12 or hammer 16 to limit the downward movement of hammer 16. In this manner, the precise depth of case hole 24 can be controlled so that the bottom of geophbne 28 contacts the bottom of case hole 24 as illustrated in FIG. 4. In one embodiment of the invention, the diameter of case hole 24 is slightly less than the exterior diameter of geophone 28. This difference in diameter provides a tight, controlled fit between geophone 28 and case hole 24. By controlling such fit, the extent of coupling therebetween is also controlled so that variables in seismic energy detection are reduced. As shown in FIG. 4, geophone 28 can have vertical, longitudinal ribs 38 for enhancing the coupling effectiveness between geophone 28 and case hole 24.

In another embodiment of the invention, controller 32 can automatically monitor the depth of case hole 24 formed with hammer 16. If case hole 24 is not sufficiently deep, geophone 28 will not be effectively coupled to soil 18. If soil 18 comprises bedrock, a single stroke of hammer 12 may not adequately create the desired case hole 24 depth. In such event, sensor 40 detects the position of hammer 16 and delivers a position signal to controller 32. If the proper depth has not be achieved, controller 32 automatically retracts hammer and releases hammer 16 to impact soil 18 a second time. Such process is reiterated by controller 32 until the proper case hole 24 configuration is achieved. Such operation is accomplished without operator intervention, and can be overridden by an operator if sufficient progress is not accomplished. In such event, operator can change head 20 to another configuration or type, or can implement operation of another case hole 24 formation device. Controller 32 also records the steps required to generate each case hole 24, which provides information regarding the soil 18 conditions local to each case hole 24. Such information can be correlated with the seismic data recorded to permit data set adjustments in the processing of such data. This feature of the invention accounts for variations in the coupling effectiveness between geophones 28 and different soil conditions, and permits data correction for such variations.

Figure 5:
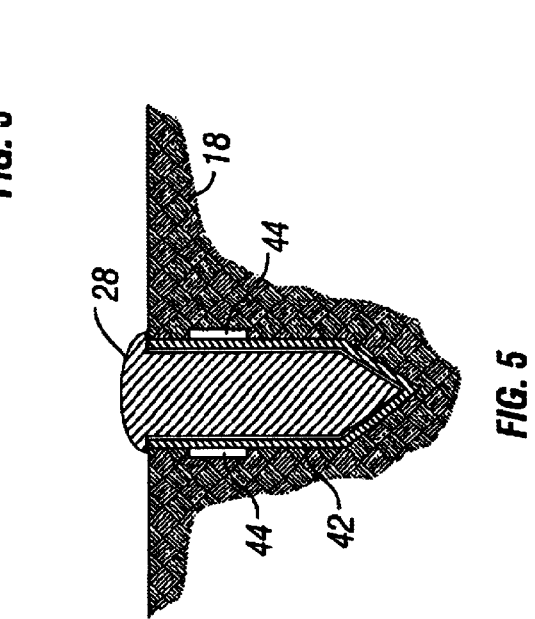
FIG. 5 illustrates a sleeve coupled between a geophone and the soil.

FIG. 5 illustrates another embodiment of the invention wherein sleeve 42 is inserted into case hole 24, and geophone 28 is coupled to sleeve 42. Sleeve 42 is particularly useful for loose and unconsolidated soil 18 because sleeve 42 compacts and retains soil 18 from further movement. Sleeve 42 can be formed with plastic, metal, or with organic or inorganic materials and can be dedicated in place or can be removed for reuse at another location. Sleeve 42 can have ribs 44 or similar protrusions to prevent rotation of sleeve 42 within soil 18. Additionally, the interior of sleeve 42 can be configured to mate with the exterior of geophone 28 to facilitate orientation, installation and coupling of geophone 28.

By controlling the orientation and placement of each case hole 24, accuracy of data detected by geophones 28 is increased. Accurate accounting for case hole 24 placement enhances recorded seismic data processing. Additionally, the initial plant of each geophone 28 is more effective, thereby eliminating the need to adjust or move geophones 28 after a geophone 28 is planted in a case hole 24. This feature of the invention not only increases operating productivity by eliminating geophone 28 repositioning steps, but also provides higher quality seismic data by more accurately measuring the character of soil motion and the direction of movement transmitted through soil 18.

The invention significantly increases soil/geophone coupling. The interface between conventional geophones and the soil is effectively eliminated, as the soil proximate to the geophone transforms into an extension of the geophone housing. Increased coupling and a lower profile significantly reduces signal noise. Case flexure and resonances in the horizontal plane are substantially eliminated, permitting deployment of a single geophone instead of multiple geophones conventionally deployed to address undesirable factors. Single sensor deployment reduces cost and increases overall survey productivity. Additionally, deployment of single sensor increases data processing control over the sensor positioning effects, thereby increasing finer resolution and enhanced data quality.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An apparatus for coupling a seismic geophone to soil, comprising:
   a portable chassis;
   a frame engaged with said chassis;
   an orientation device engaged with said frame for selectively orienting said frame to vertical; and
   a hammer moveable relative to said frame to contact the soil in a vertical direction for generating a case opening suitable for, subsequent insertion of the geophone, wherein said hammer is retractable from the case opening generated by said hammer, and a controller engaged with said orientation device and with said hammer for controlling movement of said hammer in a vertical direction.

2. An apparatus as recited in claim 1, further comprising a controller capable of controlling the compass bearing of the geophone as the geophone is inserted into said case opening.

3. An apparatus as recited in claim 1, further comprising a sensor for detecting downward movement of said hammer and for operating said controller to repeat operation of said hammer into contact with the soil until downward movement of said hammer reaches a selected elevation within the soil.

4. An apparatus as recited in claim 1, further comprising a stop for limiting downward movement of said hammer.

5. An apparatus as recited in claim 1, further comprising a template for contacting the soil as said hammer is retracted from said case opening.

6. An apparatus as recited in claim 1, wherein said hammer includes a removable head having a selected shape for controlling the shape and compaction characteristics of said hammer relative to the soil.

7. An apparatus as recited in claim 1, further comprising an actuator for inserting the geophone into said case opening.

8. An apparatus for coupling a seismic geophone to soil, comprising:
   a portable chassis:
   a frame engaged with said chassis,
   an orientation device engaged with said frame for selectively orienting said frame to vertical:

a hammer moveable relative to said frame to contact the soil in a vertical direction for generating a case opening suitable for insertion of the geophone, wherein said hammer is retractable from the case opening generated by said hammer: and a positioning device attached to said chassis for identifying the geographic location of said hammer.

9. An apparatus for coupling a seismic geophone to soil, comprising:

a portable chassis;

a frame engaged with said chassis;

an orientation device engaged with said frame for selectively orienting said frame to vertical;

a hammer vertically moveable relative to said frame;

an actuator for driving said hammer downwardly in a vertical direction for generating a case opening suitable for insertion of the geophone, wherein said actuator is further capable of retracting said hammer from the case opening; and a controller for directing movement of said chassis, for operating said orientation device to orient said frame to vertical and for operating said actuator to move said hammer downwardly and to retract said hammer after said case opening is formed, wherein said controller is further capable of detecting variations of said frame from said vertical and of recording data reflecting such variations.

10. An apparatus for coupling a seismic geophone to soil, comprising:

a portable chassis;

a frame engaged with said chassis;

an orientation device engaged with said frame for selectively orienting said frame to vertical;

a hammer vertically moveable relative to said frame; and an actuator for driving said hammer downwardly in a vertical direction for generating a case opening suitable for subsequent insertion of the geophone, wherein said actuator is further capable of retracting said hammer from the case opening.

11. An apparatus as recited in claim 10, wherein said actuator comprises a release mechanism for permitting said hammer to fall due to gravity.

12. An apparatus as recited in claim 10, further comprising a controller for directing movement of said chassis, for operating said orientation device to orient said frame to vertical, and for operating said actuator to move said hammer downwardly and to retract said hammer after said case opening is formed.

13. An apparatus as recited in claim 12, wherein said actuator is activated with compressed air to accelerate said hammer.

14. A method for coupling a seismic geophone to soil, comprising the steps of:

moving a portable chassis to a selected position;

operating an orientation device engaged with a frame mounted to said chassis to selectively orient said frame to vertical;

moving a hammer relative to said frame to contact the soil in a vertical direction to form a case opening suitable for subsequent insertion of the geophone;

ceasing downward movement of said hammer at a selected position sufficient to form a case opening having a selected shape; and retracting said hammer from said case opening.

15. A method as recited in claim 14, further comprising the step of replacing said hammer with another hammer having a selected shape associated with the shape of a selected geophone.

16. A method as recited in claim 14, further comprising the step of inserting a geophone into said case opening.

17. A method as recited in claim 16, further comprising the step of orienting said geophone in a selected compass heading as said geophone is inserted into said case opening.

18. A method as recited in claim 14, further comprising the step of sensing the downward travel of said hammer into the soil and of reciprocating said hammer relative to said frame until said case opening has said selected shape.

19. A method as recited in claim 14, further comprising the step of operating a controller to operate said orientation device, to move said hammer, to insert said geophone in said case opening, and to collect data regarding the orientation of said geophone.

* * * * *